United States Patent
Mattisson et al.

(10) Patent No.: US 6,690,740 B1
(45) Date of Patent: Feb. 10, 2004

(54) METHODS AND APPARATUS FOR PROVIDING ROBUST SYNCHRONIZATION OF RADIO TRANSCEIVERS

(75) Inventors: Sven Mattisson, Bjärred (SE); Joakim Persson, Lund (SE); Jacobus Cornelius Haartsen, Hardenberg (NL)

(73) Assignee: Telefonaktiebolaget L M Ericsson, Stockholm (SE)

(*) Notice: Subject to any disclaimer, the term of this patent is extended or adjusted under 35 U.S.C. 154(b) by 0 days.

(21) Appl. No.: 09/372,250

(22) Filed: Aug. 11, 1999

Related U.S. Application Data

(60) Provisional application No. 60/097,051, filed on Aug. 19, 1998.

(51) Int. Cl.[7] ............................ H04L 27/20; H04J 3/02
(52) U.S. Cl. ............................... 375/295; 370/462
(58) Field of Search ............................... 375/344, 316, 375/319, 295; 714/745, 746; 360/45–65

(56) References Cited

U.S. PATENT DOCUMENTS

| | | | |
|---|---|---|---|
| 4,054,754 A | 10/1977 | Nicodemus et al. | |
| 4,623,886 A | * 11/1986 | Livingston | 340/825.5 |
| 4,873,702 A | 10/1989 | Chiu | |
| 4,905,234 A | * 2/1990 | Childress et al. | 370/349 |
| 5,012,491 A | 4/1991 | Iwasaki | |
| 5,566,213 A | 10/1996 | Carsello | |
| 5,663,989 A | 9/1997 | Fobbester | |
| 5,732,339 A | 3/1998 | Auvray et al. | |
| 5,748,681 A | 5/1998 | Comino et al. | 375/319 |
| 5,878,090 A | * 3/1999 | Stephens | 375/326 |
| 6,094,576 A | * 7/2000 | Hakkinen et al. | 455/422 |
| 6,332,205 B1 | * 12/2001 | Conway | 714/746 |

FOREIGN PATENT DOCUMENTS

EP  0 651 520  5/1995

* cited by examiner

Primary Examiner—Stephen Chin
Assistant Examiner—Lawrence Williams
(74) Attorney, Agent, or Firm—Burns, Doane, Swecker & Mathis, L.L.P.

(57) ABSTRACT

Methods and apparatus for performing synchronization and DC-offset compensation in FM transmission systems significantly reduce the overhead associated with transmitting a conventional digital preamble at the start of each of a succession of transmitted digital data packets. According to exemplary embodiments, a multi-part digital preamble includes a short, substantially DC-free leading part followed by a code-protected synchronization part which is not necessarily substantially DC-free. The leading part provides for coarse DC offset estimation and synchronization, while the coded synchronization part carries timing and/or other useful information which can be unique for each packet. One or more substantially DC-free trailing parts follow the synchronization part, or are included in the synchronization part itself, and provide for fine tuning of the DC-offset estimate. Since the substantially DC-free leading and trailing parts are extremely short, and since the synchronization part carries useful information, the overhead associated with a preamble according to the invention is significantly reduced as compared to a conventional, entirely DC-free, preamble.

48 Claims, 3 Drawing Sheets

METHODS AND APPARATUS FOR PROVIDING ROBUST SYNCHRONIZATION OF RADIO TRANSCEIVERS

CROSS-REFERENCE TO RELATED APPLICATION

The present application claims the benefit of U.S. Provisional Application No. 60/097,051, filed Aug. 19, 1998 and entitled Methods and Apparatus for Providing Robust Synchronization in Radio Transceivers, which is incorporated herein in its entirety by reference.

FIELD OF THE INVENTION

The present invention relates to radio communications, and more particularly, to synchronization and DC-offset compensation in frequency modulation (FM) radio transceivers.

BACKGROUND OF THE INVENTION

An FM signal is typically demodulated by multiplying the FM signal by its time derivative. This is due to the fact that the resulting product amplitude is proportional to both the amplitude and the angular frequency of the FM signal, the angular frequency including both an intermediate frequency (IF) and an induced FM frequency deviation. Thus, when the FM signal is made to have a constant amplitude envelope (e.g., when the FM signal is processed using an automatic gain control, or AGC, processor or a hard limiter), the resulting product signal has an amplitude which is proportional to the angular frequency alone, and the modulation signal of interest can be recovered by using a low-pass filter to remove signal components at multiples of the IF frequency.

This concept is shown in FIG. 1, wherein an FM transmission system 100 is shown to include a frequency modulation processor 105 and a frequency demodulation processor including a time derivative processor 110, a mixer 120 and a low-pass filter 130. In FIG. 1, a baseband signal of interest (e.g., a digital voice or other data waveform in which a high voltage level represents a logical 1 and a low voltage level represents a logical 0) is coupled to an input of the frequency modulation processor 105, and the frequency modulation processor 105 provides an FM output signal for transmission (e.g., across the air interface) to the frequency demodulation processor.

Within the frequency demodulation processor, a constant envelope FM signal is coupled to an input of the time derivative processor 110 and to a first input of the mixer 120. Further, an output of the time derivative processor 110 is coupled to a second input of the mixer 120, and an output of the mixer is coupled to an input of the low-pass filter 130. An output of the low-pass filter represents a recovered version of the baseband signal of interest. Those of skill in the art will appreciate that the below described functionality of the components of FIG. 1 can be implemented using known hardware techniques.

On the FM transmitter side, the frequency modulation processor 105 uses the baseband signal to modulate the frequency of an IF carrier, for example using some form of frequency shift keying (e.g., Gaussian frequency shift keying or GFSK). The resulting FM output signal is then typically upconverted to a designated portion of the available radio spectrum before transmission. On the FM receiver side, the received FM signal is downconverted and hard limited to provide the constant envelope FM input signal.

The time derivative processor 110 then dynamically computes the instantaneous time derivative of the FM input signal, and the mixer 120 multiplies the instantaneous time derivative of the FM input signal with the FM input signal itself. As noted above, the output of the mixer 120 is thus proportional to the angular frequency of the FM input signal, including the IF carrier and the induced FM frequency deviation. The low-pass filter 130 then removes multiples of the IF carrier to recover the baseband signal.

In practice, an FM detector (e.g., the combination of the time derivative processor 110 and the mixer 120 of FIG. 1) must include accurate delay elements or filters with well controlled phase characteristics to generate the time-derivative approximation. Otherwise, excessive DC offset can be introduced into the detected signal, such DC offset potentially disrupting successful synchronization and detection of the baseband signal of interest. Moreover, improper tuning of an IF filter (e.g., the low-pass filter 130 of FIG. 1), as well as inaccuracies in the local reference oscillator (LO) used to generate the IF frequency at the transmitting and/or the receiving side, can also introduce significant DC offset in the recovered baseband signal. Although the reference oscillators and the passive resonator components used to implement FM detectors and IF filters can be trimmed at production time, these components are subject to detuning with time and with varying operating conditions, and DC offsets in the recovered signal can nonetheless be a problem.

Consequently, FM receivers are typically designed to dynamically compensate for DC offset. Advantageously, such dynamic skewing of the output of an IF strip (i.e., an FM detector and an IF filter) compensates for local and remote reference frequency differences, as well as detuning of passive resonator components, and thus improves overall FM receiver sensitivity. In conventional DC-offset compensation schemes, at least a portion of the FM signal (e.g., the preamble of a digital data packet) is designed to have zero mean (e.g., an equal number of logical 1's and 0's). Doing so permits a relatively simple analog circuit to be used for obtaining a dynamic estimate of the prevailing DC-offset at an FM receiver. However, known methods for providing and utilizing a zeromean signal for DC-offset compensation and FM receiver synchronization add significant overhead to the baseband signal being transmitted. In applications where speed is critical, such signal overhead can be prohibitive. Consequently, there is a need for improved methods and apparatus for providing DC-offset compensation and signal synchronization in FM communications systems.

SUMMARY OF THE INVENTION

The present invention fulfills the above-described and other needs by providing a multi-part digital preamble for use in transmitting digital data packets. Advantageously, a preamble according to the invention substantially reduces the overall length of DC-free sequences that are transmitted with each data packet in a digital FM system. According to exemplary embodiments, a multi-part preamble includes a short, substantially DC-free leading part which enables coarse estimation of a prevailing DC level at an FM receiver. The exemplary preamble also includes a synchronization part which is not necessarily substantially DC-free and which carries timing and/or other useful information (e.g., channel identification, destination address, etc.) that can vary from data packet to data packet (e.g., depending on sender, recipient, time of day, etc.). According to the invention, the synchronization word is protected by code to reduce false detection probability and can therefore be successfully detected using only the coarse DC-offset correction provided by the short leading portion of the preamble.

Following the synchronization part, or within the synchronization part itself, the exemplary multi-part preamble includes one or more substantially DC-free trailing parts that can be used to perform final DC-offset estimation and compensation. Since signal timing is well known after the synchronization part is detected, the substantially DC-free trailing part(s) can be made extremely short. Moreover, since the substantially DC-free leading and trailing parts are short, and since the synchronization part carries useful information which can be different for each data packet, the overhead associated with a digital data packet preamble according to the invention is significantly reduced as compared to conventional digital data packet preambles.

An exemplary radio transmitter according to the invention includes a modulator transmitting a succession of digital data packets by modulation of a carrier signal. In the embodiment, the modulator provides a digital preamble for each transmitted digital data packet, and each digital preamble includes a synchronization part and at least two substantially DC-free parts. For example, each digital preamble can include a substantially DC-free leading part, a synchronization part, and one or more substantially DC-free trailing parts.

An exemplary radio receiver according to the invention includes a detector receiving and demodulating a succession of digital data packets (each digital data packet including a digital preamble, and each digital preamble including a synchronization part and at least two substantially DC-free parts), and an estimation and synchronization processor estimating and removing a DC offset from an output of the detector and synchronizing the output of the detector. In the embodiment, the processor provides a coarse estimate of the DC offset for each digital data packet based on one of the substantially DC-free parts of the data packet preamble and synchronizes each digital data packet based on the synchronization part of the data packet preamble once the coarse estimate for the data packet is established. Further, the processor provides a fine estimate of the DC offset for each digital data packet based on another of the substantially DC-free parts of the data packet preamble once synchronization for the data packet is established. Each digital preamble can include, for example, a substantially DC-free leading part, a synchronization part, and one or more substantially DC-free trailing parts.

The above-described and other features and advantages of the invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

DETAILED DESCRIPTION OF THE INVENTION

Figure 1:
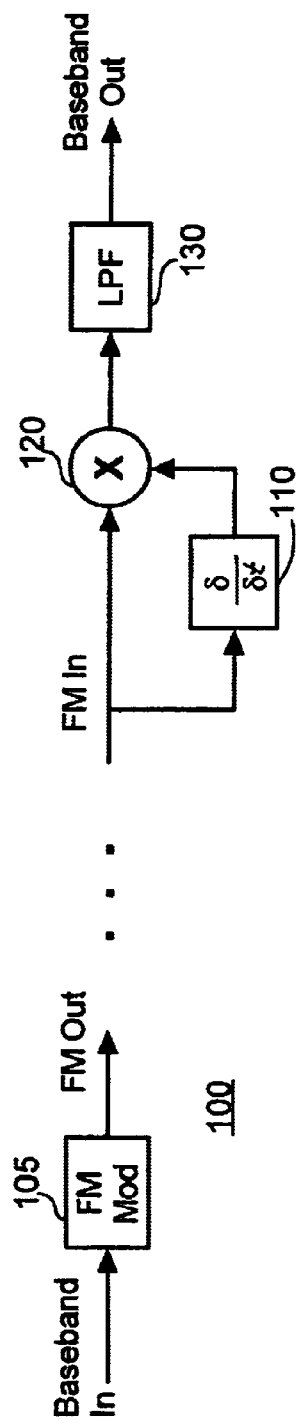
FIG. 1 depicts an exemplary FM transmission system in which the synchronization and DC-offset compensation techniques of the invention can be implemented.
Figure 2:
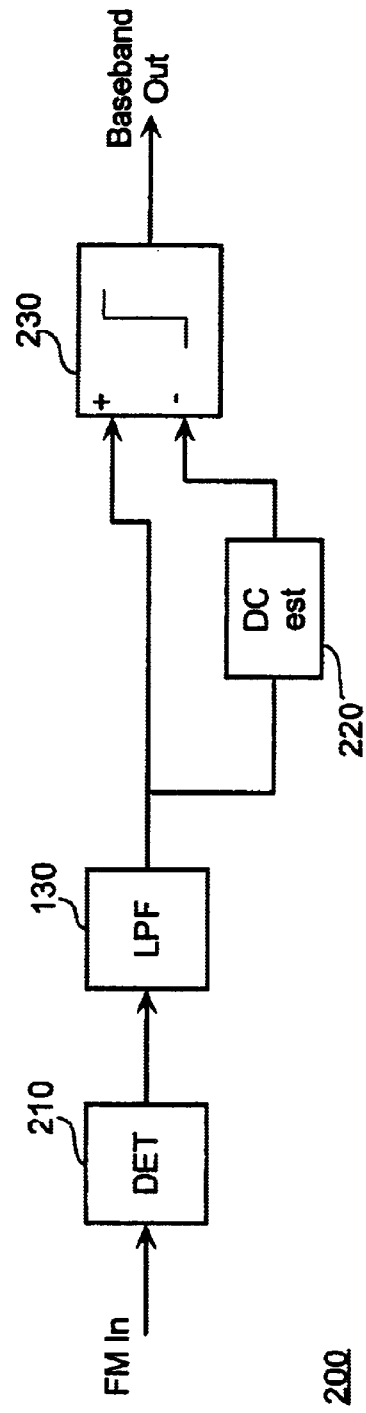
FIG. 2 depicts an exemplary FM detection system, including DC-offset compensation, in which the techniques of the invention can be implemented.

FIG. 2 depicts an exemplary FM demodulation processor 200 including DC-offset compensation. As shown, the processor 200 includes an FM detector 210, a DC estimation processor 220 and a comparator 230 (also known as a slicer), as well as the low-pass filter 130 of FIG. 1. A constant amplitude FM signal is coupled to an input of the FM detector 210, and an output of the FM detector is coupled to the input of the low-pass filter 130. Output of the low-pass filter 130 is coupled to an additive input of the slicer 230 and to an input of the DC estimation processor 220. An output of the DC estimation processor 220 is coupled to a subtractive input of the comparator 230, and an output of the comparator 230 represents the recovered baseband signal of interest. As with FIG. 1, those of skill in the art will appreciate that the below described functionality of the components of FIG. 2 can be implemented using known hardware techniques.

In operation, the FM detector 210 (which includes, for example, the time derivative processor 110 and the mixer 120 of FIG. 1) and the low-pass filter 130 process the constant amplitude FM signal (which is obtained, for example, by downconverting and hard limiting an FM signal received via the air interface) to provide a baseband signal including a DC offset (resulting, for example, from detuning of the FM detector 210, the low-pass filter 130 and/or the remote and local IF oscillators as described above). The DC estimation processor 220 then dynamically estimates the prevailing DC-offset, and the slicer 230 removes the DC-offset estimate to provide a DC-free baseband signal as output.

Figure 3:
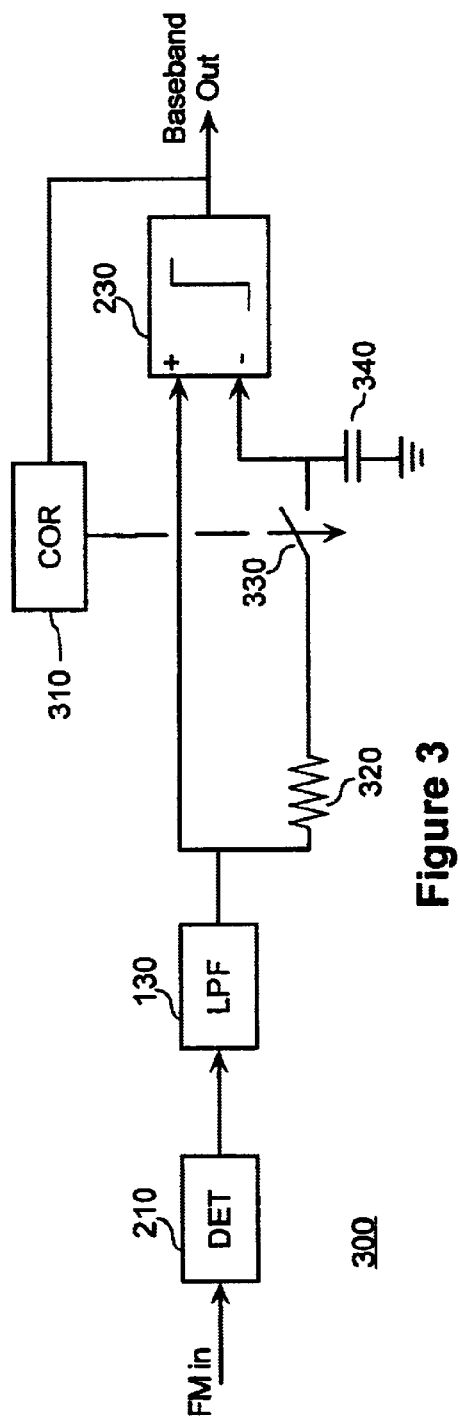
FIG. 3 depicts an exemplary FM detection system, including an exemplary synchronization and DC-offset compensation processor in which the techniques of the invention can be implemented.

The DC estimation processor 220 can be implemented in a number of ways. An exemplary DC estimation processor is depicted in FIG. 3, wherein an exemplary FM demodulation processor 300 is shown to include a correlation processor 310, a resistor 320, a switch 330 and a capacitor 340, as well as the FM detector 210, the low-pass filter 130 and the slicer 230 of FIG. 2.

In the figure, a constant envelope FM input signal is coupled to the input of the FM detector 210, and the output of the FM detector 210 is coupled to an input of the low-pass filter 130. The output of the low-pass filter 130 is coupled to the additive input of the slicer 230 and to one side of the resistor 320. An opposite side of the resistor 320 is coupled to a first contact of the switch 330, and a second contact of the switch 330 is coupled to the subtractive input of the slicer 230. The output of the slicer 230 represents the recovered DC-free baseband signal as described below and is fed back to an input of the correlation processor. Additionally, an output of the correlation processor is coupled to a control input of the switch 330, and the capacitor 340 is coupled between the second contact of the switch 330 and circuit ground.

In operation, the FM detector 210 and the low-pass filter 130 process the constant envelope FM signal to provide the baseband signal including DC offset as is described above with respect to FIG. 2. Initially (e.g., at the beginning of reception of an incoming digital data packet), the switch 330 is closed and the resistor 320 and the capacitor 340 act as a low-pass filter, or averaging circuit, so that only the DC component of the baseband signal is coupled to the subtractive input of the slicer 230.

Thus, assuming that the transmitted baseband signal is DC-free (e.g., includes an equal number of high and low voltage levels corresponding to logical 1's and 0's), the subtractive input of the slicer 230 receives an estimate of the DC offset in the detected baseband signal (i.e., an estimate of the DC bias in the output of the low-pass filter 130 resulting from detuning of the FM detector 210, the IF filter 130, and/or the reference oscillator at the transmitter and/or the receiver). As a result, the slicer 230 removes the DC offset from the IF filter output to provide the DC-corrected baseband signal as desired.

Once an accurate DC-offset estimate has been established, the switch 330 can be opened so that the DC-offset estimate is effectively stored by the capacitor 340. Thereafter, the FM signal need not be DC-free in order for the slicer 230 to remove the DC offset. Thus, according to conventional DC-offset compensation and synchronization techniques, each data packet in a digital FM system is preceded by a DC-free digital preamble which provides for estimation and storage of the DC offset prior to reception and decoding of actual data for each packet.

Figure 4:
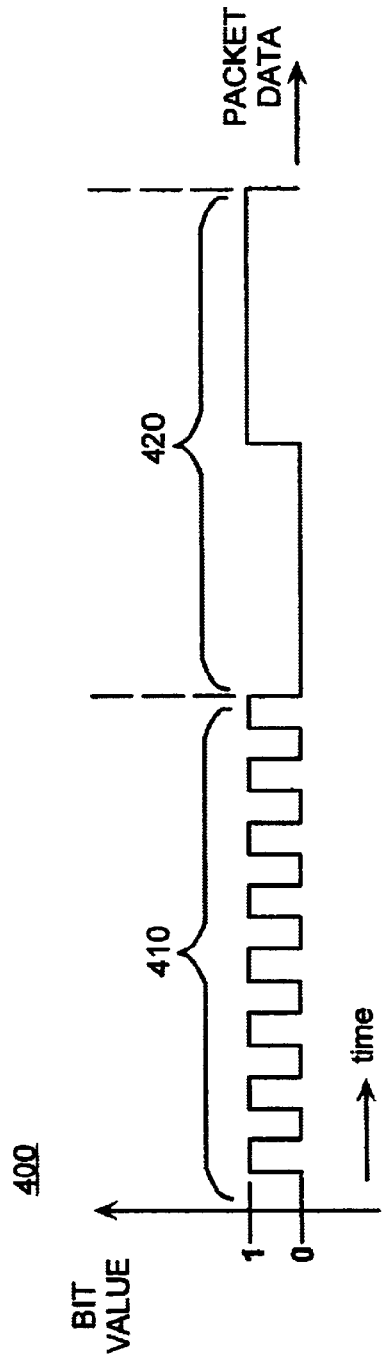
FIG. 4 depicts a conventional two-part preamble for a digital data packet to be transmitted by frequency modulation.

For example, a well known two-part digital preamble includes a 16-bit sequence of alternating 1's and 0's, followed by a DC-free synchronization code word including an equal number of 1's and 0's (though not necessarily alternating). Such a two-part digital preamble is shown in FIG. 4. In the figure, a 32-bit digital preamble 400 is shown to include a leading 16-bit sequence 410 of alternating logical 1's and 0's followed by a 16-bit DC-free synchronization word 420 including an equal number of logical 1's and 0's. Those of skill in the art will appreciate that, although the synchronization word 420 is shown to include eight logical 0's followed by eight logical 1's, the synchronization word can include any 16-bit combination containing an equal number of logical 1's and logical 0's.

In the system 300 of FIG. 3 (with the switch 330 in the closed position), the 16-bit leading sequence 410 induces a DC voltage on the capacitor 340 which is at least approximately equal to the DC-offset in the baseband output of the low-pass IF filter 130. As a result, the baseband output of the slicer 230 is at least close to DC-free and is therefore a reasonable facsimile of the true (i.e., transmitted) baseband signal. Thus, the correlation processor 310, which is programmed with the known synchronization word 420, is able to detect a synchronization word match. Upon detecting such a match, the correlation processor 310 opens the switch 330 to store the prevailing DC-offset estimate (which remains valid during reception and detection of the synchronization word since the synchronization word is also DC-free) for reception and detection of the incoming digital data packet.

Although the above described two-part, DC-free preamble does provide for quality synchronization and DC-offset compensation, it does so at the cost of significant transmission overhead. More specifically, 32 bits bearing no information are transmitted with each data packet. Since the entire preamble must have zero mean, no (or at least very little) information can be coded into it.

To alleviate this problem, the present invention discloses that a digital preamble can be strategically divided into three or more parts so that synchronization and other information can be included within the preamble while still enabling accurate DC estimation. Specifically, a short leading DC-free part of the preamble (e.g., alternating logical 1's and 0's, or any other sequence including an equal number of logical 1's and logical 0's) can be used to provide initial, coarse DC-offset estimation. Thereafter, a synchronization part of the preamble, which is not necessarily DC free, but which is protected by code to prevent detection errors, can be used not only to synchronize detection of a data packet, but also to carry timing and/or other useful information (e.g., channel identification, destination address, time of day, user identification, etc.).

Following the synchronization part, or within the synchronization part itself, one or more trailing DC-free parts (e.g., sequences of alternating logical 1's and 0's, or other sequences including an equal number of logical 1's and logical 0's) can be included to provide for finer DC-offset estimation prior to detection of the data packet following the multi-part preamble. Since the synchronization part is protected by coding, and since timing is precisely known after the synchronization part has been detected, the trailing DC-free part(s), like the leading DC-free part, can be extremely short. Consequently, the overhead introduced by the DC-free portions of the multi-part preamble is much reduced as compared to the above described two-part preamble.

Figure 5:
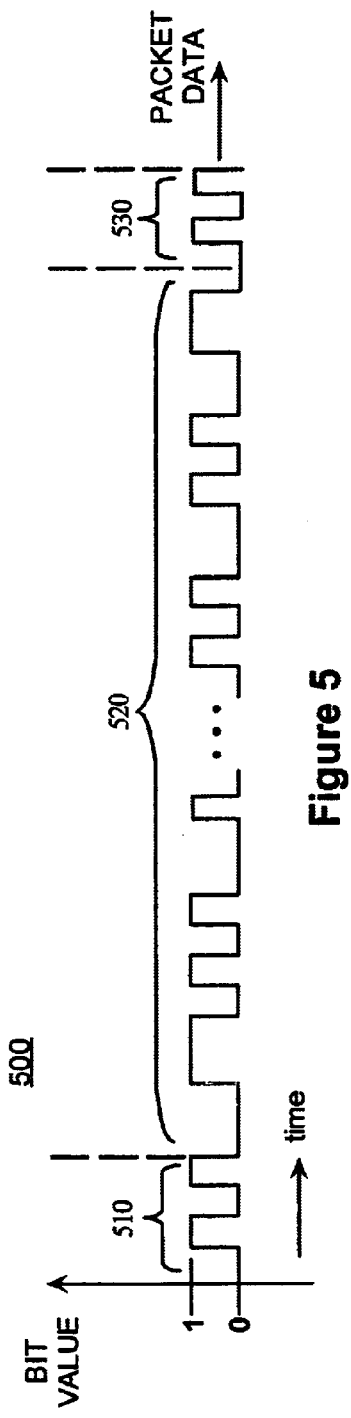
FIG. 5 depicts an exemplary three-part preamble, according to the invention, for a digital data packet to be transmitted by frequency modulation.

An exemplary multi-part preamble according to the invention is depicted in FIG. 5. In the figure, a three-part preamble 500 is shown to include a DC-free leading sequence 510, followed by a multiple-bit synchronization word 520 which is not necessarily DC free and which can be different for each data packet. The synchronization word 520, which can include timing and/or other information and which is coded to protect against detection errors, is in turn followed by a trailing DC-free sequence 530. Although the leading and trailing DC-free sequences 510, 530 are shown in the figure as 4-bit sequences of alternating logical 1's and 0's, those of ordinary skill will appreciate that each DC-free sequence 510, 530 can, in practice, be shorter or longer in length and can include any DC-free sequence having an equal number of logical 1's and logical 0's.

When the exemplary preamble 500 is received by the system 300 of FIG. 3, the leading DC-free sequence 510 induces a coarse estimate of the baseband DC offset on the storage capacitor 340. Although the estimate is coarse, it is sufficient to permit successful detection of the coded synchronization word 520 (e.g., by the correlation processor 310). Methods for coding of a synchronization word to protect against erroneous detection in the presence of some DC-offset are known to those of skill in the art. Once the correlation processor 310 has detected the synchronization word 520, timing between received bits is well known. Consequently, the correlation processor 310 can open the switch 330 precisely at the end of the trailing DC-free sequence 530 to thereby store an accurate estimate of the DC offset for reception and detection of the incoming digital data packet.

As is described above, the fact that the DC-free sequences 510, 530 can be very short, combined with the fact that the synchronization word 520 can carry useful information, means that the overhead associated with the exemplary three-part preamble 500 is considerably reduced as compared to a conventional DC-free preamble. Those of skill in the art will appreciate that the precise lengths of the three parts 510, 520, 530 of the preamble 500 shown in FIG. 5 can vary and are a matter of design choice. Additionally, the exemplary preamble 500 can include additional trailing DC-free sequences which can, for example, be embedded within the synchronization word 520.

Note also that it is possible to find synchronization codes (e.g., codes for the synchronization word 520) such that each synchronization word is guaranteed to start with, include, and/or end with a DC-free sequence without seriously degrading code performance. In such case, leading and/or trailing DC-free sequences (e.g., the leading sequence 510 and/or the trailing sequence 530 of FIG. 5) can be omitted, and the total preamble length can be reduced. Alternatively, leading and/or trailing sequences, which are not necessarily DC-free, can be chosen strategically based on one or more bits of an already coded synchronization word, to effectively extend the length of the leading and/or trailing DC-free parts of the preamble. For example, an m-bit leading or trailing sequence can be selected based on a first or last k bits of a synchronization word so that the first or last k+m bits of the overall preamble are DC-free.

According to a particular exemplary embodiment of the invention, a three-part digital preamble includes a leading four-bit sequence of alternating logical 1's and 0's, followed by a varying encoded synchronization and information sequence of 64 bits which is in turn followed by a four-bit alternating sequence of logical 1's and 0's. The synchronization sequences are coded so that the last two synchronization bits are guaranteed to be either logical 10 or logical 01, and the trailing sequence is then chosen so as to guarantee that the final six bits of the overall preamble (i.e., the last two bits of the synchronization word and the four bits of the trailing DC-free sequence) are alternating logical 1's and 0's. This is implemented, for example, by selectively inverting a stored trailer (e.g., 1010 or 0101) in dependence upon the final bit of the coded synchronization word.

Those of skill in the art will appreciate that the simple RC averager of FIG. 3 (i.e., the combination of the resistor 320 and the capacitor 340) is shown for illustrative purposes and that, in practice, more sophisticated linear estimation circuits can be implemented. Additionally, a high-impedance resistor can be positioned across the contacts of the switch 330 to provide for slow tracking of changes in the baseband DC offset once the switch 330 has been opened.

Figure 6:
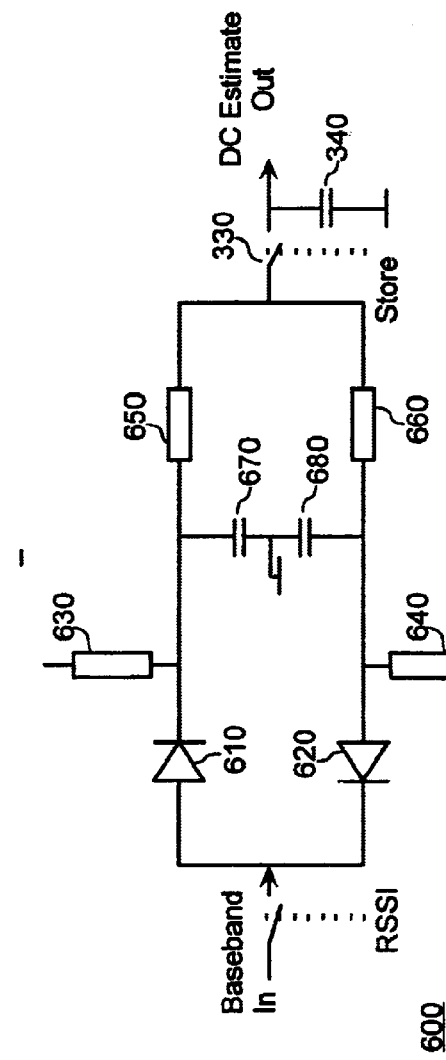
FIG. 6 depicts an alternative DC-offset compensation processor with which the techniques of the invention can be implemented.

Note also that non-linear estimation circuits work well with the overhead-reducing preamble of the invention. FIG. 6 depicts an exemplary non-linear estimation circuit 600 which can, for example, replace the resistor 320, the switch 330 and the capacitor 340 in the system 300 of FIG. 3. In FIG. 6, the nonlinear estimator is shown to include first and second diodes 610, 620, first and second supply resistors 630, 640, first and second peak storage capacitors 670, 680, and first and second averaging resistors 650, 660, as well as the storage switch 330 and the storage capacitor 340 of FIG. 3.

In operation, the first diode 610, the first supply resistor 630, and the first peak storage capacitor 670 act in combination as a positive peak detector circuit so that the positive envelope of the detected baseband signal (e.g., the output of the IF filter 130 of FIG. 3) is stored on the first peak storage capacitor 670. At the same time, the second diode 620, the second supply resistor 640, and the second peak storage capacitor 680 act in combination as a negative peak detector circuit so that the negative envelope of the detected baseband signal is stored on the second peak storage capacitor 680. Thus, when the switch 330 is closed, the positive and negative envelopes are averaged through the first and second averaging resistors 650, 660, respectively, and an estimate of the DC offset in the baseband signal is induced on the storage capacitor 340.

As before, the storage switch 330 can be opened once an accurate DC offset estimate has been established (e.g., at the end of reception of a multi-part preamble according to the invention). Additionally, as is shown in FIG. 6, another switch can be positioned prior to the estimation circuit so that the DC offset estimate is not perturbed by poor signal conditions. In other words, a received signal strength indicator (RSSI) can be used to control the front-end switch so that the DC offset estimate is only updated when the received signal is of sufficient strength. Methods for implementing a received signal strength indicator are known to those of skill in the art.

Generally, the present invention discloses methods and apparatus for reducing the overhead associated with synchronization and DC-offset compensation in FM transmission systems. According to an exemplary embodiment, a multi-part digital preamble includes a short leading DC-free part and a code-protected synchronization part which is not necessarily DC-free and which carries timing and/or other useful information. Additionally, one or more trailing DC-free parts provide for fine tuning of the DC-offset estimate. Advantageously, since the leading and trailing DC-free parts are very short, and since the synchronization part carries useful information which can be different for each data packet, the overhead associated with a digital preamble according to the invention is significantly reduced as compared to a conventional, entirely DC-free, digital preamble.

Those skilled in the art will appreciate that the invention is not limited to the specific embodiments which have been described herein for purposes of illustration and that numerous alternative embodiments are also contemplated. For example, although the leading and trailing parts of a multipart digital preamble according to the invention are sometimes described above as strictly DC-free, those of skill in the art will appreciate that substantially DC-free leading and trailing parts (e.g., leading and trailing sequences containing slightly more logical ones than logical zeroes or vice versa) can also provide for satisfactory, if somewhat degraded, synchronization and offset compensation in certain contexts. The scope of the invention is therefore defined by the claims which are appended hereto, rather than the foregoing description, and all equivalents which are consistent with the meaning of the claims are intended to be embraced therein.

We claim:

1. A radio transmitter, comprising:

a modulator transmitting a succession of digital data packets by modulation of a carrier signal, wherein said modulator provides a digital preamble for each transmitted digital data packet, and wherein each digital preamble includes a synchronization part and at least two substantially DC-free parts including a first substantially DC-free part for use in forming a coarse estimate of a DC offset for a corresponding one of the digital data packets after reception, and a second substantially DC-free part for use in forming a fine estimate of the DC offset for a corresponding one of the digital data packets after reception.

2. A radio transmitter according to claim 1, wherein each digital preamble includes a substantially DC-free leading part, a synchronization part, and one or more substantially DC-free trailing parts.

3. A radio transmitter according to claim 2, wherein each synchronization part is coded to protect against detection errors at a receiver.

4. A radio transmitter according to claim 2, wherein each synchronization part includes timing information.

5. A radio transmitter according to claim 2, wherein each synchronization part includes information specific to the digital data packet with which the synchronization part is included.

6. A radio transmitter according to claim 5, wherein each synchronization part includes at least one of a channel identifier, a destination address and a recipient identification for the digital data packet with which the synchronization part is associated.

7. A radio transmitter according to claim 2, wherein a synchronization word is generated to provide the digital preamble for each digital data packet, each synchronization word being coded to include a substantially DC-free leading sequence, a synchronization sequence and one or more substantially DC-free trailing sequences.

8. A radio transmitter according to claim 2, wherein a leading sequence, a synchronization sequence and one or more trailing sequences are generated separately and combined to provide the digital preamble for each digital data packet.

9. A radio transmitter according to claim 8, wherein the leading sequence of each digital preamble is substantially DC-free.

10. A radio transmitter according to claim 8, wherein a trailing sequence of each digital preamble is substantially DC-free.

11. A radio transmitter according to claim 8, wherein an m-bit leading sequence is chosen based on a first k bits of a corresponding synchronization sequence so that a first k+m bits of each digital preamble is substantially DC-free.

12. A radio transmitter according to claim 8, wherein an m-bit trailing sequence is chosen based on a last k bits of a corresponding synchronization sequence so that a last k+m bits of each digital preamble is substantially DC-free.

13. A radio transmitter according to claim 8, wherein each digital preamble includes a leading sequence of alternating logical ones and logical zeroes, followed by a synchronization sequence, followed by a trailing sequence of alternating logical ones and logical zeroes.

14. A radio transmitter according to claim 13, wherein each leading sequence is four bits in length, wherein each synchronization sequence is sixty-four bits in length, wherein each trailing sequence is four bits in length, and wherein each trailing sequence is chosen based on one or more final bits of the synchronization sequence to ensure that each digital preamble concludes with a six-bit DC-free sequence.

15. A radio transmitter according to claim 14, wherein each trailing sequence is generated by selectively inverting a stored DC-free sequence in dependence upon a final bit of the synchronization sequence.

16. A radio receiver, comprising:
a detector receiving and demodulating a succession of digital data packets, each digital data packet including a digital preamble, each digital preamble including a synchronization part and at least two substantially DC-free parts; and
an estimation and synchronization processor estimating and removing a DC offset from an output of said detector and synchronizing the output of said detector, wherein said processor provides a coarse estimate of the DC offset for each digital data packet based on one of the substantially DC-free parts of the data packet preamble, synchronizes each digital data packet based on the synchronization part of the data packet preamble once the coarse estimate for the data packet is established, and provides a fine estimate of the DC offset for each digital data packet based on another of the substantially DC-free parts of the data packet preamble once synchronization for the data packet is established.

17. A radio receiver according to claim 16, wherein each digital preamble includes a substantially DC-free leading part, a synchronization part, and one or more substantially DC-free trailing parts.

18. A radio receiver according to claim 17, wherein each synchronization part is coded to protect against detection errors at a receiver.

19. A radio receiver according to claim 17, wherein each synchronization part includes timing information.

20. A radio receiver according to claim 17, wherein each synchronization part includes information specific to the digital data packet with which the synchronization part is included.

21. A radio receiver according to claim 20, wherein each synchronization part includes at least one of a channel identifier, a destination address and a recipient identification for the digital data packet with which the synchronization part is associated.

22. A radio receiver according to claim 17, wherein a synchronization word is included in the digital preamble for each digital data packet, each synchronization word being coded to include a substantially DC-free leading sequence, a synchronization sequence and one or more substantially DC-free trailing sequences.

23. A radio receiver according to claim 17, wherein a leading sequence, a synchronization sequence and one or more trailing sequences are combined in the digital preamble of each digital data packet.

24. A radio receiver according to claim 23, wherein the leading sequence of each digital preamble is substantially DC-free.

25. A radio receiver according to claim 23, wherein a trailing sequence of each digital preamble is substantially DC-free.

26. A radio receiver according to claim 23, wherein an m-bit leading sequence is chosen based on a first k bits of a corresponding synchronization sequence so that a first k+m bits of each digital preamble is substantially DC-free.

27. A radio receiver according to claim 23, wherein an m-bit trailing sequence is chosen based on a last k bits of a corresponding synchronization sequence so that a last k+m bits of each digital preamble is substantially DC-free.

28. A radio receiver according to claim 23, wherein each digital preamble includes a leading sequence of alternating logical ones and logical zeroes, followed by a synchronization sequence, followed by a trailing sequence of alternating logical ones and logical zeroes.

29. A radio receiver according to claim 28, wherein each leading sequence is four bits in length, wherein each synchronization sequence is sixty-four bits in length, wherein each trailing sequence is four bits in length, and wherein each trailing sequence is chosen based on one or more final bits of the synchronization sequence to ensure that each digital preamble concludes with a six-bit DC-free sequence.

30. A radio receiver according to claim 29, wherein each trailing sequence is generated by selectively inverting a stored DC-free sequence in dependence upon a final bit of the synchronization sequence.

31. A radio receiver according to claim 16, wherein said estimation and synchronization processor includes a filter resistor, a storage capacitor and a comparator.

32. A radio receiver according to claim 31, wherein said estimation and synchronization processor further includes a correlation processor and a switch.

33. A method for communicating a digital data packet, comprising the steps of:
generating a digital preamble for the digital data packet, the preamble including a synchronization part and at least two substantially DC-free parts including a first substantially DC-free part for use in forming a coarse estimate of a DC offset for the digital data packet after reception, and a second substantially DC-free part for use in forming a fine estimate of the DC offset for the digital data packet after reception; and transmitting the digital preamble, with the digital data packet, from a transmitter to a receiver.

34. A method according to claim 33, wherein each digital preamble includes a substantially DC-free leading part, a synchronization part, and one or more substantially DC-free trailing parts.

35. A method according to claim 34, wherein each synchronization part is coded to protect against detection errors at a receiver.

36. A method according to claim 34, wherein each synchronization part includes timing information.

37. A method according to claim 34, wherein each synchronization part includes information specific to the digital data packet with which the synchronization part is included.

38. A method according to claim 37, wherein each synchronization part includes at least one of a channel identifier, a destination address and a recipient identification for the digital data packet with which the synchronization part is associated.

39. A method according to claim 34, wherein a synchronization word is generated to provide the digital preamble for each digital data packet, each synchronization word being coded to include a substantially DC-free leading sequence, a synchronization sequence and one or more substantially DC-free trailing sequences.

40. A method according to claim 34, wherein a leading sequence, a synchronization sequence and one or more trailing sequences are generated separately and combined to provide the digital preamble for each digital data packet.

41. A method according to claim 40, wherein the leading sequence of each digital preamble is substantially DC-free.

42. A method according to claim 40, wherein a trailing sequence of each digital preamble is substantially DC-free.

43. A method according to claim 40, wherein an m-bit leading sequence is chosen based on a first k bits of a corresponding synchronization sequence so that a first k+m bits of each digital preamble is substantially DC-free.

44. A method according to claim 40, wherein an m-bit trailing sequence is chosen based on a last k bits of a corresponding synchronization sequence so that a last k+m bits of each digital preamble is substantially DC-free.

45. A method according to claim 40, wherein each digital preamble includes a leading sequence of alternating logical ones and logical zeroes, followed by a synchronization sequence, followed by a trailing sequence of alternating logical ones and logical zeroes.

46. A method according to claim 45, wherein each leading sequence is four bits in length, wherein each synchronization sequence is sixty-four bits in length, wherein each trailing sequence is four bits in length, and wherein each trailing sequence is chosen based on one or more final bits of the synchronization sequence to ensure that each digital preamble concludes with a six-bit DC-free sequence.

47. A method according to claim 46, wherein each trailing sequence is generated by selectively inverting a stored DC-free sequence in dependence upon a final bit of the synchronization sequence.

48. A method according to claim 35, further comprising the steps of:

providing, at the receiver, a coarse estimate of a DC offset for the digital data packet based on one of the substantially DC-free parts of the data packet preamble;

synchronizing the digital data packet at the receiver based on the synchronization part of the data packet preamble and the coarse estimate; and providing, at the receiver, a fine estimate of the DC offset for the digital data packet based on another of the substantially DC-free parts of the data packet preamble once synchronization for the data packet is established.

* * * * *